United States Patent [19]

Pinto

[11] Patent Number: 4,696,871
[45] Date of Patent: Sep. 29, 1987

[54] ELECTRICITY PRODUCTION

[75] Inventor: Alwyn Pinto, Middlesbrough, England

[73] Assignee: Imperial Chemical Industries PLC, London, England

[21] Appl. No.: 918,580

[22] Filed: Oct. 14, 1986

[30] Foreign Application Priority Data

Oct. 22, 1985 [GB] United Kingdom ............... 8526055

[51] Int. Cl.⁴ ............................................. H01M 8/06
[52] U.S. Cl. ........................................ 429/17; 429/19
[58] Field of Search .............................. 429/17, 19, 20

[56] References Cited

U.S. PATENT DOCUMENTS

| 3,976,506 | 8/1976 | Landau | 429/17 |
| 3,976,507 | 8/1976 | Bloomfield | 429/17 |
| 4,004,947 | 1/1977 | Bloomfield | 429/17 |
| 4,522,894 | 6/1985 | Hwang et al. | 429/17 |
| 4,539,267 | 9/1985 | Sederquist | 429/17 |

FOREIGN PATENT DOCUMENTS

| 60-158562 | 8/1985 | Japan | 429/17 |
| 1537082 | 12/1978 | United Kingdom . | |

Primary Examiner—Aaron Weisstuch
Attorney, Agent, or Firm—Cushman, Darby & Cushman

[57] ABSTRACT

Electricity production using a fuel cell wherein the fuel stream is obtained by reacting a hydrocarbon with steam and air so that the exothermic reaction of the hydrocarbon and air supplies the heat required for the endothermic steam reforming reaction. Energy is recovered by letting down the anode, and preferably also the cathode, off-gas from the fuel cell in a turbine driving the air compressor. The anode off-gas from the fuel cell is combusted, preferably catalytically, to preheat one or more of the reactants used in the hydrocarbon/steam/air reaction prior to passage through the turbine.

7 Claims, 2 Drawing Figures

ELECTRICITY PRODUCTION

This invention relates to electricity production and in particular to the production of electricity using a fuel cell wherein hydrogen in a gas stream entering the anode gas space of the fuel cell is oxidised by air supplied to the cathode gas space.

It has been proposed in GB-A-1,537,082 to produce the hydrogen-containing gas stream by steam reforming a hydrocarbon feedstock, optionally followed by the shift reaction wherein carbon monoxide in the gas stream is reacted with steam to produce carbon dioxide and more hydrogen. In the process described in that reference, wherein the fuel cell is operated at superatmospheric pressure, the air supply to the fuel cell is compressed in a compressor. The off-gas from the cathode gas space of the fuel cell, preferably together with the flue gas from the reformer furnace, is let down through a turbine driving the air compressor supplying the compressed air to the cathode gas space of the fuel cell and also to the reformer furnace. That reference discloses that the off-gas from the anode gas space of the fuel cell may be used as some or all of the fuel required for the reformer furnace and/or that part of this anode off-gas may be recycled to the reformer as part of the feedstock or simply be let down through the turbine.

Steam reforming reactors, and furnaces therefor, suitable for generating hydrogen-containing gas streams for fuel cell use are described in, inter alia, U.S. Pat. No. 4,098,587; 4,098,588; and 4,098,589. In this type of reformer the process gas and steam are passed through catalyst-containing tubes disposed in a furnace.

Although both the process reactants, i.e. process gas and steam, and the combustion reactants, i.e. furnace fuel and air, are normally at similar pressures, the reformer tubes have to be constructed to be of sufficient strength to withstand bursting should the pressure within the furnace drop, e.g. as a result of failure of the air compressor or of the supply of fuel cell anode off-gas (where the latter is used as the furnace fuel). Of course the outer casing of the reformer furnace also has to be strong enough to withstand the superatmospheric pressure of the combustion reactants.

In the present invention the arrangement of GB-A-1,537,082 is modified to avoid the need for such strong reformer tubes.

Accordingly the present invention provides a process for the production of electricity using a fuel cell wherein (a) a hydrocarbon feedstock is reacted with steam to produce a hydrogen-containing gas stream at superatmospheric pressure, (b) the hydrogen-containing gas stream is fed, at super atmospheric pressure, to the anode gas space of a fuel cell, (c) air at superatmospheric pressure is fed to the cathode gas space of a fuel cell, and (d) at least the off-gas from the anode gas space of the fuel cell is let down through a turbine driving an air compressor compressing the air required in step (c), characterised in that (i) the hydrocarbon-containing feedstock is reacted with steam and with air at superatmospheric pressure supplied by said compressor with the heat required for the endothermic reaction of said feedstock and steam being supplied by the exothermic reaction of said feedstock and said air, and (ii) before being let down through said turbine, the off-gas from said fuel cell anode gas space is reacted with compressed air from said compressor to produce a heated waste gas stream and heat is recovered from said waste gas stream by heat exchange to preheat at least one of the reactants required in step (i).

Preferably the compressed air required in step (i) is preheated by heat exchange with said heated waste gas stream.

In the present invention therefore the hydrogen-containing gas stream is generated by a partial oxidation process using air compressed by the turbine driven compressor. This enables the reactor employed for the partial oxidation process to be of a type that does not require tubes that have to withstand large pressure differences across their walls in the event of failure of part of the process.

Recovery of heat from the reaction of anode off-gas with compressed air for preheating one or more of the reactants, particularly the air, fed to the hydrogen-containing gas stream production stage is necessary in order that a partial oxidation process can supply the heat required for the endothermic reaction of feedstock and steam without combustion of an undue amount of feedstock.

In one form of the invention, the hydrocarbon feedstock is subjected to a primary reforming step, by reaction with steam, prior to the partial oxidation step. In this case the partial oxidation is a secondary reforming process, and the heat required for the primary reforming step is supplied by the heat in the exit gas from the secondary reforming process. In a preferred arrangement, within the pressure shell used for the secondary reforming step, a tubular primary reformer is also provided so that the secondary reformer exit gas heats the primary reformer tubes: means are provided to feed the process gas leaving the primary reformer tubes to the secondary reformer. Since the pressure in the primary reformer tubes is necessarily similar to that external thereto, it is not necessary that the tubes have to withstand a large pressure difference across their walls in the event of process failure.

The partial oxidation or secondary reforming steps (and primary reforming step if used) is (are) preferably catalytic. Likewise the reaction of the anode off-gas with compressed air is preferably a catalytic combustion.

The hydrocarbon feedstock, which should be subjected to a desulphurisation step prior to use, preferably has a boiling point at atmospheric pressure of not more than 220° C. and is most conveniently gaseous at NTP. In particular it has a hydrogen to carbon atomic ratio of at least 3.5. Natural gas or methane are preferred feedstocks.

As is normal practice, heat is desirably recovered from the partial oxidation (or secondary reformer) exit gas (after that gas has been used to supply the heat for any primary reforming step) by heat exchange with the reactants e.g. hydrocarbon feedstock steam, and/or air in order to preheat those reactants.

As a result of the partial oxidation (or secondary reforming) the gas stream will contain hydrogen, carbon oxides, steam, inerts e.g. nitrogen and argon, and a little unreacted methane. The gas stream is preferably subjected to the shift reaction wherein carbon monoxide reacts with steam to give carbon dioxide and hydrogen. This process is exothermic and heat evolved is preferably recovered by heat exchange, e.g. to heat boiler feed water or by steam raising.

Where the presence of carbon dioxide in the gas stream fed to the fuel cell can be tolerated, then the gas, after shift, is fed to the fuel cell anode gas space, optionally after condensing water therefrom. The condensed water may be used as part of the water required to produce the steam required in the reforming step. Where carbon dioxide in the gas fed to the fuel cell is not desired, then it can be removed by conventional methods, e.g. scrubbing with aqueous potassium carbonate solution or by a pressure swing absorption process. Where carbon dioxide is removed, a preliminary condensation step to remove the excess of steam as water will normally be employed. Such a condensation step will often also be necessary even when there is no carbon dioxide removal step in order to condense out any ammonia formed during the reforming process.

The off-gas from the cathode gas space of the fuel cell can be combined with the off-gas from the anode gas space before or after reaction, i.e. combustion, of the latter with air, or can be let down through a separate turbine also driving the air compressor. If desired water may be condensed from the cathode gas space off-gas and/or from the anode gas space off-gas after combustion of the latter, e.g. for use as boiler feed water, before or after passage of the waste gas through the turbine or turbines.

The process is preferably operated at a pressure in the range 2 to 20 bar abs but will normally depend on the type of fuel cell employed.

BRIEF DESCRIPTION OF THE DRAWING

Two embodiments of the invention are further described with reference to the accompanying flow sheets shown in FIGS. 1 and 2.

In the embodiment of FIG. 1 the compressed feedstock, e.g. natural gas that has been desulphurised, is fed via line 1 to a saturator 2 wherein it is saturated with hot water supplied by a line 3. The pressure and water temperature are preferably such that the feedstock/steam mixture leaving saturator 2 via line 4 has a steam:carbon ratio of 2:1 to 5:1. This mixture is preheated, in one or more stages, in a heat exhanger 5 from whence it is fed, via line 6, to a reactants feed zone 7 of a combined primary and secondary reformer 8. This reformer 8 has an outer pressure shell 9 within which are mounted one or more tubes 10 (only one of which is shown) containing a primary steam reforming catalyst 11. Tubes 10 are mounted on a tube plate 12 and extend from the reactants feed zone 7 downwards through a heat exchange zone 13. Tubes 10 have external fins 14 extending for the major proportion of their catalyst filled length. At their lower end, tubes 10 extend through a bed 15 of a secondary steam reforming catalyst, which is preferably in the form of a refractory honeycomb impregnated or coated with the catalytically active material, into a zone 16 to which preheated compressed air is supplied via line 17. The reformer 8, which may be provided with one or more burners to effect ignition in zone 16, is provided with a reformed gas outlet 18 at the upper end of heat exchange zone 13.

Figure 1:
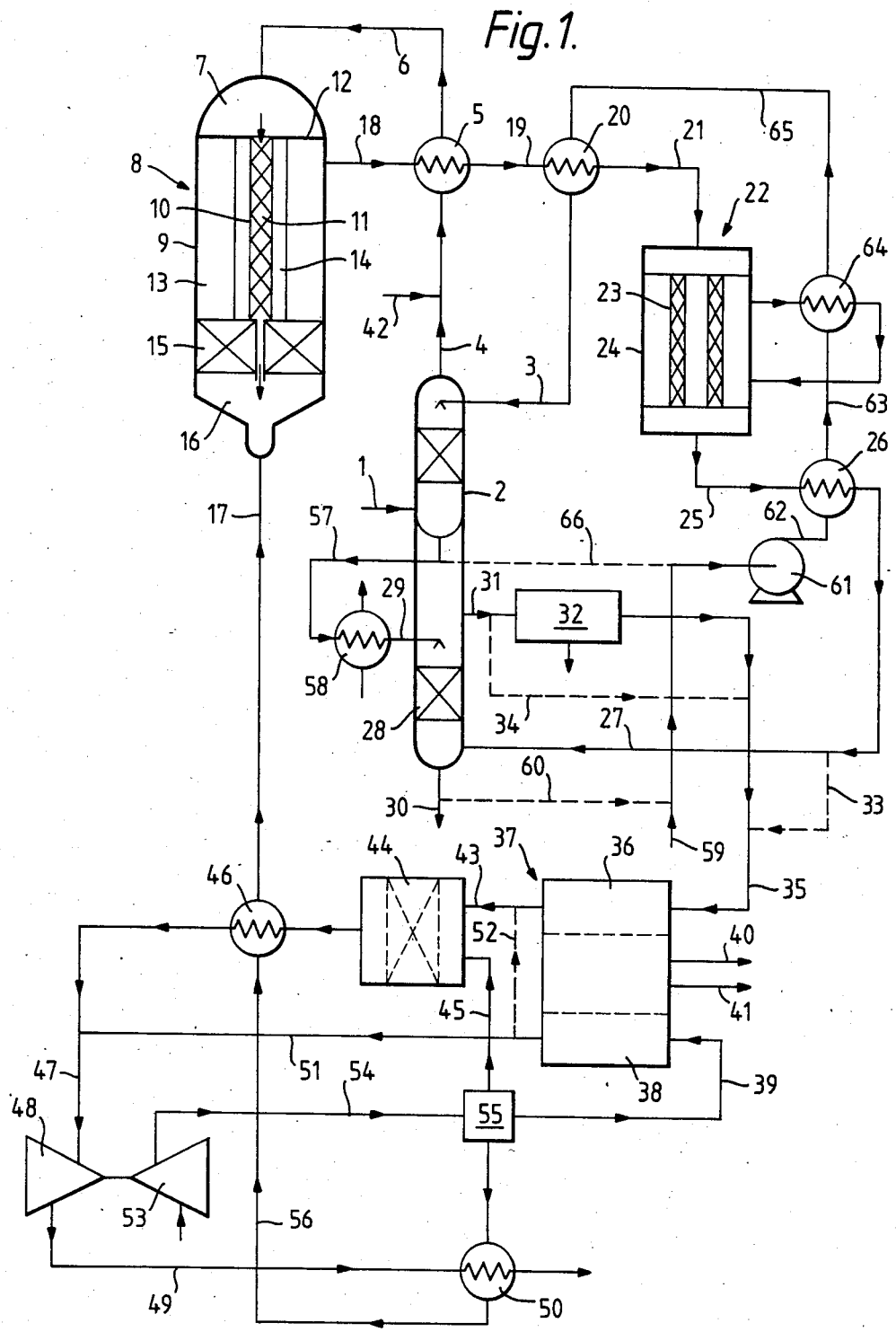

The preheated feedstock/steam mixture fed to reactants feed zone 7 passes down tubes 10 wherein it is reformed by means of contact with catalyst 11. The primary reformed gas leaving the lower ends of tubes 10 reacts with the air supplied via line 17 and passes up through bed 15 wherein catalytic secondary reforming of the gas mixture takes place with the heat of reaction provided by the oxidation of part of the primary reformed gas stream with the oxygen in the air added via line 17. The hot gas stream from bed 15, which typically has a temperature of 750° to 900° C. on leaving bed 15, passes up heat exchange zone 13 past finned tubes 10 thus heating them and providing the heat required for the primary reforming within tubes 10. The reformed gas stream, which is typically now at a temperature of 500° to 600° C. is led from the upper end of heat exchange zone 13 via line 18 to heat exchanger 5, then, now typically at a temperature of 300° to 450° C., via line 19 to a second heat exchanger 20, and thence, via line 21 to a water cooled shift reactor 22 in which the shift catalyst is disposed in tubes 23 surrounded by water in a pressure shell 24. From shift reactor 22, the hydrogen-containing gas stream, is passed, via line 25, to a heat exchanger 26. Alternatively an air-cooled shift reactor could be employed. ( In one form of the invention the gas stream from heat exchanger 26 is then fed via line 27 to a condenser 28 wherein it is cooled by water supplied by line 29, to condense the excess of steam therefrom as water (which is drained from condenser 28 via line 30) and then via line 31 to a carbon dioxide removal stage 32, which may be of the pressure swing absorption type.

In another form of the invention, where carbon dioxide can be tolerated in the fuel cell, the carbon dioxide removal stage 32 can be omitted. Also, where the fuel cell is to be operated at a relatively high temperature it may not be necessary to condense out water at this stage: hence, as shown by dotted line 33 the condensation and carbon dioxide removal steps may be bypassed.

However fuel cells that can tolerate carbon dioxide are liable to be adversely affected by the traces of ammonia which may be produced in the reforming step: consequently even where no carbon dioxide removal step 32 is employed it is preferred to cool the gas as described above and to condense the water and ammonia therefrom in condenser 28 and simply omit the carbon dioxide separation unit 32 by means of dotted line 34.

The hydrogen-containing gas is then fed, via line 35 to the anode gas space 36 of a fuel cell 37 (which will generally be a plurality of cells in series: however only one cell is shown for simplicity). To the cathode gas space 38 of the fuel cell 37 is fed compressed air via line 39. Electricity is outputted from the fuel cell 37 via lines 40, 41 to an external load.

Depending on the type of fuel cell and its operating conditions, heat may be recovered therefrom and used for steam generation e.g. to supplement, via line 42, the steam supplied by saturator 2. For simplicity this heat recovery and steam generation is not shown.

The off-gas from the anode gas space 36 of the fuel cell 37 is fed via line 43 to a catalytic combustor 44 wherein it is reacted with compressed air supplied via a line 45.

Heat is recovered from the cataly combustor exhaust gas in heat exchanger 46. The exhaust gas from heat exchanger 46, together with the off-gas the cathode gas space 38 of the fuel cell 37 is then supplied, via line 47 to a turbine 48, wherein its pressure is let down, and then passed, via line 49, to the atmosphere, optionally via a heat exchanger 50.

Instead of being united via line 51 with the exhaust gas from the catalytic combustor 44, the off-gas from the cathode gas space 38 of the fuel cell 37 may be combined with the off-gas from the anode gas space 36 of the fuel cell 37 via the dotted line 52 so that both off-gases are fed, via line 43, to the catalytic combustor 44.

The turbine 48 drives an air compressor 53 supplying compressed air via line 54 to a splitter box 55 from whence the compressed air is fed (a) to cathode gas space 38 of the fuel cell 37 via line 39, (b) to heat exchanger 46 via line 56 and optional heat exchanger 50, and (c) to catalytic combustor 44 via line 45. The heated compressed air from heat exchanger 46 is fed via line 17 to the zone 16 of the reformer 8.

As mentioned hereinbefore, saturator 2 is supplied with hot water via line 3. The excess of water from saturator 2 is drained via line 57, and then, where the condenser 28 is not bypassed by line 33, to a heat exchanger 58 cooled by cooling water so as to provide the supply 29 of cooled water required by condenser 28.

Make-up water, supplied via line 59, optionally with some or all of the water drained from condenser 28 and supplied via dotted line 60, is fed to a pump 61 from whence it passes via line 62 to heat exchanger 26. The water heated in heat exchanger 25 is then fed, via line 63, to a heat exchanger 64 wherein it is further heated. Heat exchanger 64 is heated by water circulating between the tubes 23 of shift reactor 22. The water that has been further heated by heat exchanger 64 is fed via line 65 to heat exchanger 20 where it picks up further heat to provide the hot water feed to saturator 2.

Where the condenser 28 is bypassed by line 33, the excess of water drained from saturator 2 via line 57 is fed, via dotted line 66, together with make-up water via line 59, to the inlet of pump 61.

Instead of the combined primary/secondary reformer 8, separate primary and secondary reformers may be used: for example as described in EP-A-194067.

Figure 2:
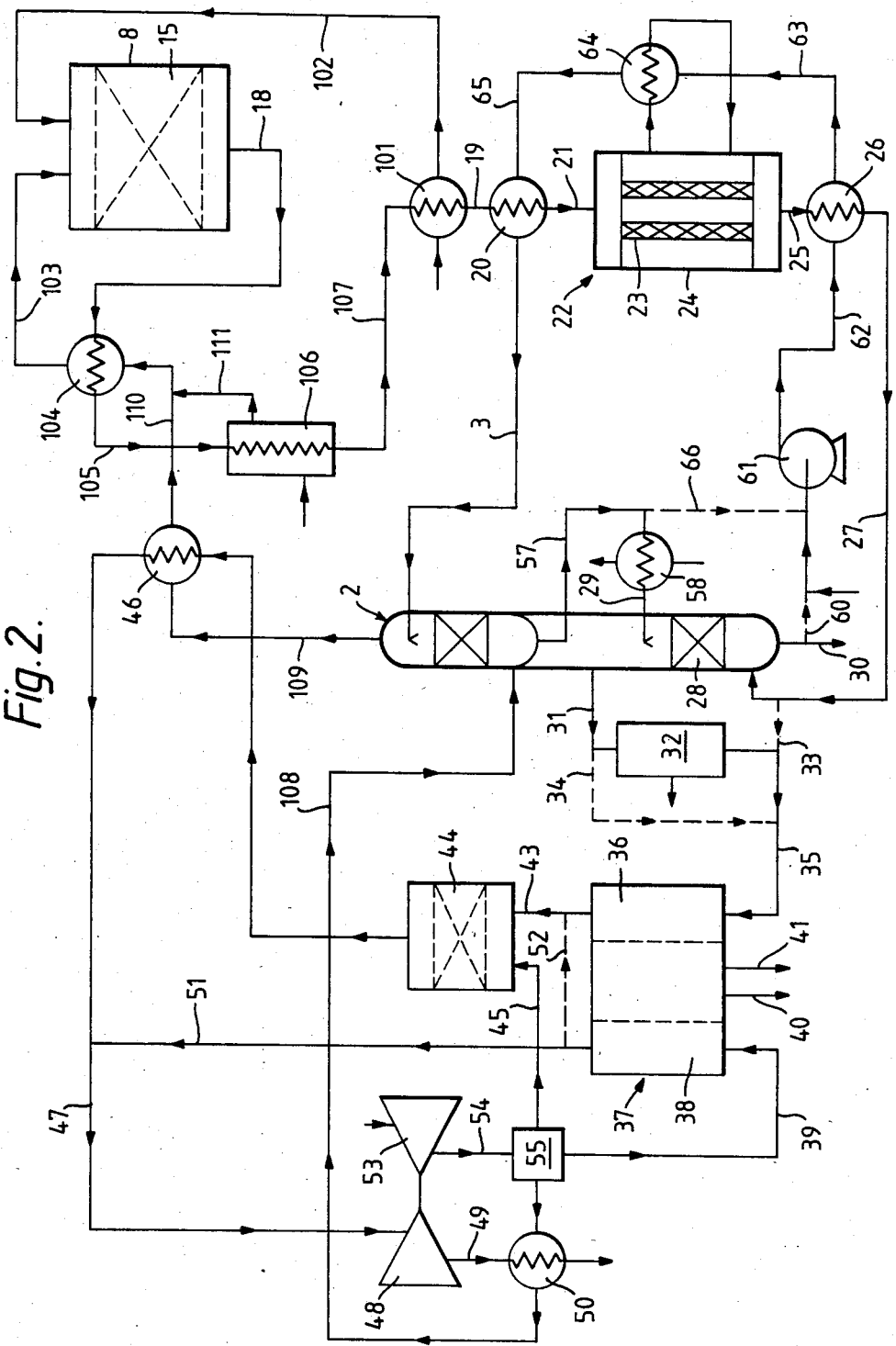

In the embodiment of FIG. 2 an alternative arrangement is shown which is more suitable when desulphurised naphtha is used as the feedstock, although natural gas could also be employed. In FIG. 2, the items corresponding to those shown in FIG. 1 are designated by the reference numerals used in FIG. 1.

In this embodiment the reformer 8 is of the autothermal type and contains only secondary reforming catalyst and the steam is incorporated into the air rather than into the hydrocarbon feed.

The desulphurised naphtha is heated in heat exchanger 101, typically to a temperature of 400° to 440° C., and then fed, via line 102, to reformer 8. A preheated mixture of air and steam, typically at a temperature of 600° to 850° C. is fed to reformer 8 via line 103. The reformed gas, typically at a temperature of 750° to 900° C. is fed, via line 18 from reformer 8 to a heat exchanger 104, where it preheats the inlet air/steam mixture, and then, via line 105 to a boiler/superheater 106. From boiler/superheater 106, the gas is fed, via line 107, to the feedstock preheating heat exchanger 101. From heat exchanger 101, the gas is fed, as in the FIG. 1 embodiment, to shift converter 22 and thence to fuel cell 37 via optional condenser 28 and optional carbon dioxide removal unit 32.

In this embodiment the compressed process air for the reformer is fed from the splitter box 55, optionally via heat exchanger 50, to the saturator 2 via line 108 where it is saturated with steam from hot water supplied via line 3 from heat exchanger 20 as in the FIG. 1 embodiment. The saturated compressed air is fed from saturator 2, via line 109, to heat exchanger 46, which is heated by the exit gas from catalytic combustor 44 as in the FIG. 1 embodiment, and thence, via line 110 to heat exchanger 104. The superheated steam produced in boiler/superheater 106 is fed, via line 111, into line 110.

In an example of a plant operating at a pressure of about 10 bar abs in accordance with the FIG. 1 flowsheet with the carbon dioxide removal step 32 (but not condenser 28) bypassed, using a fuel cell that can tolerate the presence of carbon dioxide, typical gas flow rates and temperatures are shown in the following table.

| Gas stream | Temp (°C.) | Gas flow rate (kg · mol · hr$^{-1}$) | | | | | |
|---|---|---|---|---|---|---|---|
| | | CH$_4$ | CO | CO$_2$ | H$_2$ | H$_2$O | N$_2$ + Ar | O$_2$ |
| line 6 | 425 | 13.67* | — | 0.05 | 0.37 | 37.12 | 0.47 | — |
| line 17 | 670 | — | — | — | — | 0.31 | 24.53 | 6.53 |
| line 18 | 540 | 0.24 | 9.72 | 4.93 | 35.37 | 31.01 | 25.00 | — |
| line 25 | 230 | 0.24 | 0.27 | 14.38 | 44.82 | 21.56 | 25.00 | — |

*feed gas also contains about 0.54 kg · mol · hr$^{-1}$ of higher hydrocarbons.

Depending on the efficiency of the fuel cell, this will give about 1-2 MW of electricity.

I claim:

1. A process for the production of electricity using a fuel cell wherein
   (a) a hydrocarbon-containing feedstock is reacted with steam to produce a hydrogen-containing gas stream at superatmospheric pressure,
   (b) the hydrogen-containing gas stream is fed, at superatmospheric pressure, to the anode gas space of a fuel cell,
   (c) air at superatmospheric presure is fed to the cathode gas space of the fuel cell, and
   (d) at least the off-gas from the anode gas space of the fuel cell is let down through a turbine driving an air compressor compressing the air required in step (c),
   characterised in that
   (i) the hydrocarbon-containing feedstock is reacted with steam and with air at superatmospheric pressure supplied by said compressor with the heat required for the endothermic reaction of said feedstock and steam being supplied by the exothermic reaction of said feedstock and said air, and
   (ii) before being let down through said turbine, the off-gas from said fuel cell anode gas space is reacted with compressed air from said compressor to produce a heated waste gas stream and heat is recovered from said waste gas by heat exchange to preheat at least one of the reactants required in step (i).

2. A process according to claim 1 wherein the compressed air required in the step (i) is preheated by the heat exchange with the waste gas stream.

3. A process according to claim 1 wherein the steam required in step (i) is obtained by contact of the hydrocarbon-containing feedstock or the air with a stream of hot water.

4. A process according to claim 1 wherein step (i) comprises a primary steam reforming stage wherein the hydrocarbon-containing feedstock is reacted with steam to give a primary reformed gas stream and a secondary reforming stage wherein the primary reformed gas stream is reacted with air to give a secondary reformed gas stream, and the heat required for the primary reforming step is supplied by the heat in the secondary reformed gas stream.

5. A process according to claim 4 wherein the primary and secondary reforming reactions are effected inside a single pressure shell and the primary steam reforming stage is effected in at least one tube heated by the secondary reformed gas stream.

6. A process according to claim 1 wherein the anode off-gas is combusted catalytically with the compressed air.

7. A process according to claim 1 wherein the off-gas from the cathode gas space is combined with that from the anode gas space before reaction of the latter with air.

* * * * *